3,189,525
NUCLEAR REACTOR FUEL ELEMENTS
Michael Davis, Bowdon, England, assignor to United Kingdom Atomic Energy Authority, London, England
Filed Apr. 12, 1961, Ser. No. 102,588
Claims priority, application Great Britain, Apr. 19, 1960, 13,631/60
2 Claims. (Cl. 176—81)

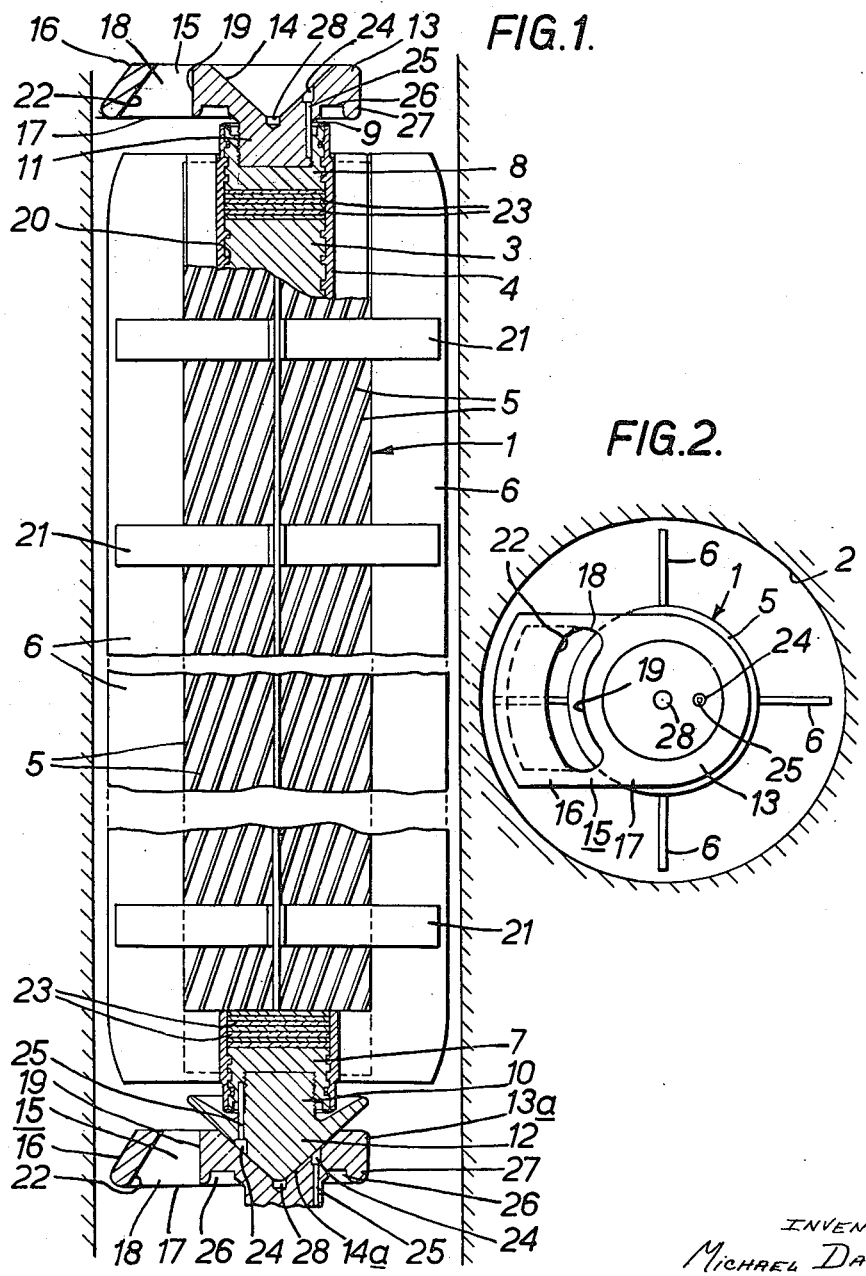

This invention relates to nuclear reactor fuel elements and is concerned with nuclear reactor fuel elements of elongate form each element having its ends equipped to allow the elements to be stacked end to end upon one another in a vertical fuel element channel of a nuclear reactor.

It has been found that, when stacked in a vertical fuel element channel with support at the bottom region thereof and when cooled by upward flow of coolant in the channel, such fuel elements can suffer from vibration due to the flow of coolant.

Known fuel elements are equipped with radial supports of spider form and/or with longitudinal or helical splitter fins for centering the elements in their channels. However, to facilitate charging and discharging of the fuel elements into and out of their channels, such supports have to be given clearance with the walls of the channels and hence are not effective in restraining the fuel elements against vibration.

It is therefore, an object of the invention to provide means for restraining such fuel elements against vibration in their channels.

According to the invention, a nuclear reactor fuel element of elongate form and having its ends equipped so that a series of fuel elements can be stacked end to end upon one another in a fuel element channel of a nuclear reactor, is provided at one end with a laterally projecting portion extending part-way round the periphery of the element and having a surface inclined to the longitudinal axis of the fuel element so that, when disposed in a fuel element channel of a nuclear reactor, the said surface is exposed to coolant flow along the channel whereby there is produced a lateral component of force tending to move the fuel element so that a part thereof is retained in contact with the wall of the channel, thereby stabilising the fuel element against vibration in the channel.

The said portion is preferably on or integral with an end fitting of the fuel element.

The said part may be constituted by the outer extremity of the said portion.

Alternatively, the said part may be one or more laterally extending supports disposed longitudinally or helically on the fuel element.

The said surface is preferably spaced from the remainder of the said end fitting so as to allow coolant to pass therebetween, the said portion bearing the surface being secured to the end fitting by one or more webs whose side surfaces are parallel to the axis of the fuel element.

The end fitting preferably incorporates means for locating with an adjacent element when the fuel elements are stacked in a channel, and may also incorporate means for engagement by a fuel element handling grab, where the fitting is a top end one.

An embodiment of the invention will now be described by way of example with reference to the accompanying drawings, wherein—

FIGURE 1 is a side view partly sectioned, and
FIGURE 2 is a plan view of FIGURE 1.

Referring to the drawings, in the construction of fuel element disclosed therein, there is illustrated in FIGURE 1 an elongate nuclear reactor fuel element 1 adapted to be stacked with other similar fuel elements in a fuel element channel 2 in the core of a nuclear reactor.

The element 1 comprises a uranium fuel member 3 surrounded by a protective sheath 4 having helical heat transfer fins 5 which are slotted to accommodate four longitudinal splitter fins 6 disposed around the fuel element at equal intervals and held in position by braces. The sheath 4 is closed off at each end by end caps 7, 8 which are welded to the sheath 4 by welds 9 and carry end fittings 10, 11 respectively. A series of circumferential grooves 20 are provided in the uranium member 3 and end-caps 7, 8, the sheath being pressurised on to the member 3 and end caps 7, 8 to prevent creep in the sheath when the fuel element is subjected to thermal cycling in a nuclear reactor. Heat insulating discs 23 are provided between the end-caps 7, 8 and the ends of the uranium member 3. The end-fitting 10 comprises a cone-shaped member 12 and the end fitting 11 comprises a cup-shaped member 13 having a recess 14 for engagement with a complementary cone-shaped member on an adjacent fuel element in a stack of similar fuel elements. A cup-shaped member 13a with a recess 14a is shown in engagement with the cone-shaped member 12. Offset apertures 24 are provided in the members 12, 13, 13a for locking pins 25 to prevent accidental disengagement of the end fittings 10, 11. The cup-shaped members 13, 13a each have on their undersides a recess 26 and an annular flange 27 projecting downwardly to provide in conjunction means whereby the end fitting 11 can be engaged by a fuel handling grab for lifting and lowering of the fuel element, there being no need for angular orientiation of the grab relative to the fuel element because the groove 26 and flange 27 are continuous. The members 13, 13a also each have a part 15 comprising a laterally projecting arcuate parallel-sided portion 16 secured integrally to the remainder of the end fitting 11 by webs 17 so as to be spaced from the remainder of the end-fitting and inclined to the longitudinal axis of the fuel element 1. A passage 18 is thus produced between the portion 16 and the remainder of the end fitting 11, the passage being convergent and being bounded by a curved but upright surface 19 on the body of the end fitting 11, the inner upright walls of the webs 17 and the curved inclined inner surface 22 of the portion 16.

In the drawings the extremity of the portion 16 and the extremities of the splitter fins 6 are shown clear of the wall of the channel 2, allowing the fuel element readily to be charged into and discharged from the channel 2. The illustrated position of the fuel element 1 is that in which the longitudinal axes of the fuel element 1 and the channel 2 coincide and would theoretically be occupied if no coolant were flowing in the channel 2. However, under the normal operating conditions of upward flow of pressurised gaseous coolant in the channel 2, flow of coolant through the passage 18 not only exerts a lateral component of force on the surface 22 which is transferred to the end fitting 8 but also produces a region of lower pressure immediately above the outlet from the passage 18 and only at that side of the channel corresponding to the part 15, and therefore serves to move the upper end of the fuel element 1 laterally, such movement of the fuel element 1 being a pivotal one about the located lower end of the fuel element 1. To enable a degree of pivoting to take place at the cup-and-cone engagement region, the cup-shaped recess 14 of each member 13 is provided with a central aperture 28 which allows the point of the engaging cone to move a limited amount laterally as the upper end of the fuel element is moved by the effect of coolant flow as aforesaid.

The coolant flow in the channel 2 causes the upper end of the fuel element 1 to be moved so as to bring the extremity of the portion 16 into contact with the wall of the channel 2 and retain it in that position, thereby stabilising the fuel element against vibration, its lower end being located by cup-and-cone engagement and the end fitting of the next lower fuel element being itself moved into a stabilised position by coolant flow, and so on. Instead of or in addition to engagement of the said extremity with the channel wall, a splitter fin or fins 6 on the same side of the fuel element 1 as the portion 16 may or may also contact the channel wall to bring about or assist in bringing about stabilisation of the fuel element 1 against vibration. In another alternative (not shown), the lower end fitting of the fuel element, which includes the cone for location in the cup-shaped recess, may be provided with a spider whose laterally extending arms normally clear the channel wall but one or more of which are moved into contact with the channel wall by virtue of the movement of the top end of the adjacent lower element due to coolant flow, the extremity of the portion 16 in this case remaining clear of the channel wall.

A convenient angle of inclination of the surface 22 to the longitudinal axis of the fuel element 1 is 35°.

I claim:

1. In an elongate fuel element for use in a fuel element channel of a nuclear reactor having coolant flowing in a path therethrough, the said element including heat transfer fins and end locating members for stacking the element with a plurality of other similar fuel elements in the channel, the improvement of a single end part at one end of the fuel element extending laterally beyond the heat transfer fins and comprising:

a portion of arcuate, parallel-sided shape extending only part way around the periphery of the fuel element and defining a surface inclined to the path of coolant flow to produce a force lateral to the fuel element at the said one end, and at least one web having sides parallel to the longitudinal axis of the element spacing the said portion from the remainder of the fuel element.

2. The improvement according to claim 1 wherein the said part includes a pair of said webs, and the said portion and the webs define a converging flow passage for coolant.

References Cited by the Examiner
UNITED STATES PATENTS

| | | | |
|---|---|---|---|
| 2,885,335 | 5/59 | Moore et al. | 176—77 |
| 2,949,415 | 8/60 | Stubbs et al. | 176—19 |
| 2,983,662 | 5/61 | Shillitto et al. | 176—30 |
| 3,027,314 | 3/62 | Vaughan | 176—81 |

FOREIGN PATENTS

| | | |
|---|---|---|
| 226,274 | 1/60 | Australia. |
| 1,166,835 | 6/58 | France. |

CARL D. QUARFORTH, *Primary Examiner.*

OSCAR R. VERTIZ, *Examiner.*